(12) United States Patent
Sahay et al.

(10) Patent No.: US 11,827,373 B2
(45) Date of Patent: Nov. 28, 2023

(54) AIRCRAFT ENGINE EXHAUST SYSTEMS ENABLING REDUCED LENGTH AFT STRUT FAIRINGS

(71) Applicant: The Boeing Company, Chicago, IL (US)

(72) Inventors: Abhishek Sahay, Everett, WA (US); David F. Cerra, Woodinville, WA (US)

(73) Assignee: The Boeing Company, Arlington, VA (US)

(*) Notice: Subject to any disclaimer, the term of this patent is extended or adjusted under 35 U.S.C. 154(b) by 378 days.

(21) Appl. No.: 16/586,133

(22) Filed: Sep. 27, 2019

(65) Prior Publication Data
US 2021/0094699 A1    Apr. 1, 2021

(51) Int. Cl.
| | | |
|---|---|---|
| *B64D 33/04* | (2006.01) | |
| *B64D 27/18* | (2006.01) | |
| *B64D 29/06* | (2006.01) | |
| *F02C 7/20* | (2006.01) | |
| *F02C 7/24* | (2006.01) | |
| *F02K 1/52* | (2006.01) | |
| *F02K 1/44* | (2006.01) | |

(52) U.S. Cl.
CPC ............ *B64D 33/04* (2013.01); *B64D 27/18* (2013.01); *B64D 29/06* (2013.01); *F02C 7/20* (2013.01); *F02C 7/24* (2013.01); *F02K 1/44* (2013.01); *F02K 1/52* (2013.01); *F05D 2220/323* (2013.01); *F05D 2240/90* (2013.01)

(58) Field of Classification Search
CPC ........ B64D 27/18; B64D 29/06; B64D 33/04; F02C 7/20; F02C 7/24; F05D 2220/323; F05D 2240/15; F05D 2240/90; F05D 2240/91; F02K 1/52; F02K 1/822; F02K 1/44; Y02T 50/60
See application file for complete search history.

(56) References Cited

U.S. PATENT DOCUMENTS

| | | | | | |
|---|---|---|---|---|---|
| 4,238,092 | A | * | 12/1980 | Brennan ................ | B64D 29/02 244/54 |
| 5,887,822 | A | * | 3/1999 | Thornock .............. | B64D 29/02 244/53 R |
| 5,906,097 | A | * | 5/1999 | Hebert .................. | B64D 29/02 60/226.1 |
| 6,983,912 | B2 | * | 1/2006 | Connelly ............... | B64D 29/02 244/119 |

(Continued)

OTHER PUBLICATIONS

Tesch, Next-Generation 737 Fuel Performance Improvement, 2012, retrieved from https://www.boeing.com/commercial/aeromagazine/articles/2012_q4/3/, last retrieved on Jul. 7, 2022.

*Primary Examiner* — Brian P Wolcott
*Assistant Examiner* — Jesse M Prager
(74) *Attorney, Agent, or Firm* — HANLEY, FLIGHT & ZIMMERMAN, LLC

(57) ABSTRACT

Aircraft engine exhaust systems enabling short aft fairings are described. An example turbofan engine exhaust system of an aircraft includes a primary nozzle having a leading edge and a trailing edge, and a heat shield coupled to an aft strut fairing. The heat shield has an upstream end and a downstream end. The downstream end of the heat shield is substantially coterminous with the trailing edge of the primary nozzle.

16 Claims, 4 Drawing Sheets

(56) References Cited

U.S. PATENT DOCUMENTS

| | | | |
|---|---|---|---|
| 2010/0051743 A1* | 3/2010 | Dumont | B64D 29/02 244/54 |
| 2011/0167786 A1* | 7/2011 | Marques | F02K 1/72 60/204 |
| 2015/0367947 A1* | 12/2015 | Audart-Noel | B64D 29/06 244/54 |
| 2016/0208641 A9* | 7/2016 | Amkraut | F02K 1/09 |
| 2017/0259906 A1* | 9/2017 | Connelly | B64D 33/04 |
| 2019/0016471 A1* | 1/2019 | Lieser | F02K 1/40 |

* cited by examiner

AIRCRAFT ENGINE EXHAUST SYSTEMS ENABLING REDUCED LENGTH AFT STRUT FAIRINGS

FIELD OF THE DISCLOSURE

This disclosure relates generally to aircraft and, more specifically, to aircraft engine exhaust systems enabling reduced length aft strut fairings.

BACKGROUND

Many types of aircraft, including transport aircraft, are equipped with wing-mounted turbofan engines. In such a configuration, core flow (e.g., heated exhaust flow) from the wing-mounted engines may impinge upon the wing surfaces or other components downstream from the turbofan engine. To protect various components of the aircraft from the core flow, many aircraft employ heat shields. While heat shields are effective at protecting various aircraft components from the effects of the core flow, heat shields often require continual cosmetic maintenance to alleviate undesirable visual effects that occur when the core flow impinges on the surface of the heat shield.

SUMMARY

An example turbofan engine exhaust system of an aircraft includes a primary nozzle having a leading edge and a trailing edge, and a heat shield coupled to an aft strut fairing. The heat shield has an upstream end and a downstream end. The downstream end of the heat shield is substantially coterminous with the trailing edge of the primary nozzle.

In some examples, an aircraft includes a turbofan engine having a primary nozzle defining a primary nozzle outlet and an aft strut fairing having a first lower surface upstream from the primary nozzle outlet and a second lower surface downstream from the primary nozzle outlet. The first lower surface having a first leading end and a first trailing end. The second lower surface having a second leading end and a second trailing end. The first trailing end and the second leading end being substantially coterminous with the primary nozzle outlet. A heat shield is coupled to the first lower surface of the aft strut fairing. The heat shield has an upstream end and a downstream end. The downstream end of the heat shield is coterminous with primary nozzle outlet.

In some examples, an aircraft includes an aircraft engine having a primary nozzle defining a primary nozzle outlet. An aft strut fairing includes a first lower portion having a first leading end upstream from the primary nozzle outlet and a first trailing end located adjacent the primary nozzle outlet, and a heat shield coupled to the first lower portion of the aft strut fairing. The heat shield having a first end upstream from the primary nozzle outlet and a second end substantially coterminous with the primary nozzle outlet and the first trailing end of the aft strut fairing.

Figure 1:
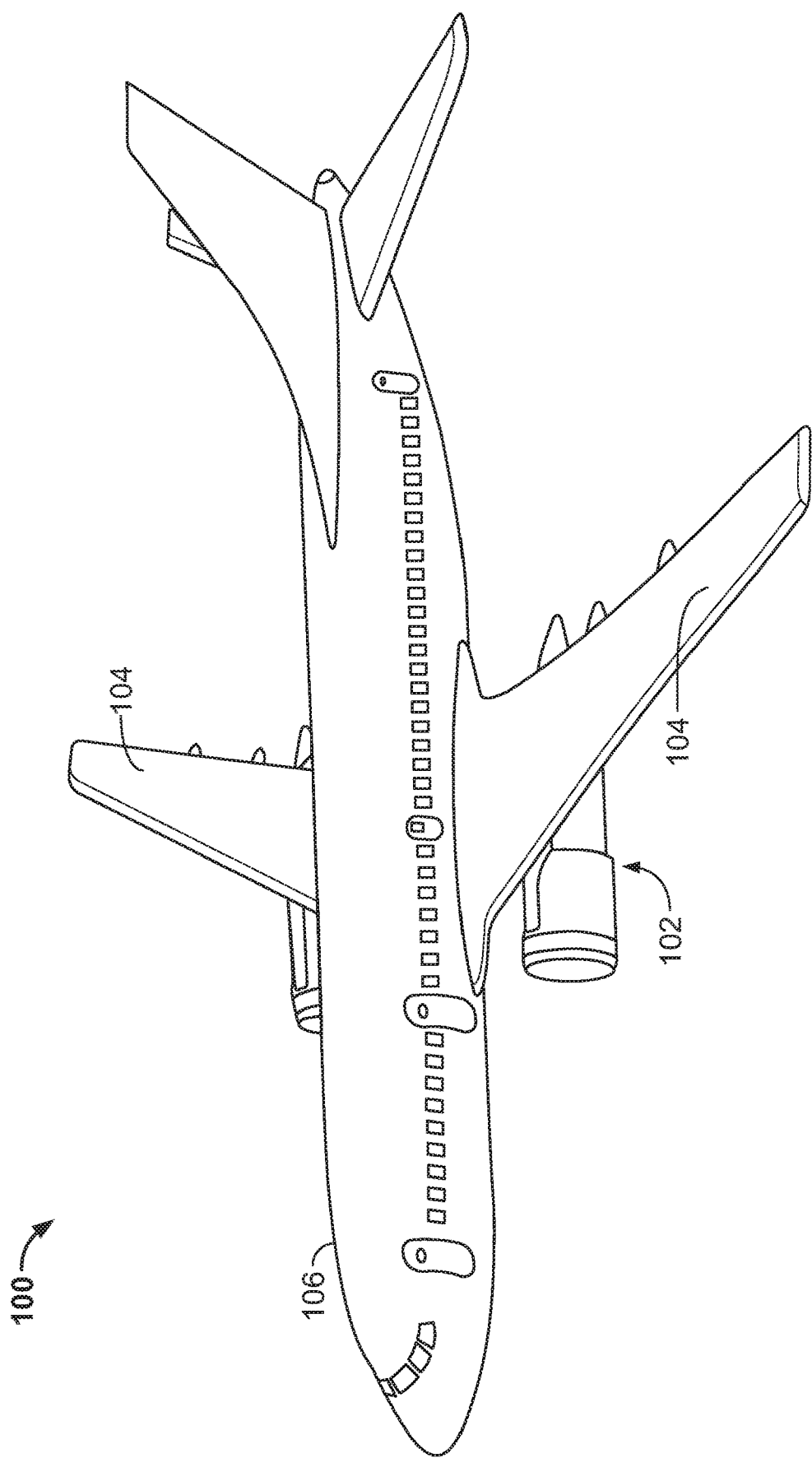
FIG. 1 illustrates an example aircraft implemented with an example aircraft engine exhaust system in accordance with teachings of this disclosure.

Certain examples are shown in the above-identified figures and described in detail below. In describing these examples, like or identical reference numbers are used to identify the same or similar elements. The figures are not necessarily to scale, and certain features and certain views of the figures may be shown exaggerated in scale or in schematic for clarity and/or conciseness.

DETAILED DESCRIPTION

Aircraft engines, such as turbofan engines, employ exhaust systems that include primary nozzles to direct a core exhaust flow (e.g., heated exhaust) from the aircraft engine. Typically, aircraft engines employ a short core nozzle design to improve efficiency of the aircraft engine. For example, a short core nozzle provides a cross-sectional flow area of a primary nozzle outlet that can enhance thrust efficiency compared to, for example, a long core nozzle. While a short core nozzle design can result in improved thrust efficiency, heat shields are often employed to protect components (e.g., an aft-strut fairing) downstream from the primary nozzle outlet of a short core nozzle from effects of the core exhaust flow (e.g., hot gasses or exhaust). For example, heat shields are often coupled to aft strut fairings downstream from the primary nozzle outlet. However, the heat shields located on an aft strut fairing are susceptible to cracking, buckling, scorching, etc. For example, the core exhaust flow exiting the primary nozzle of short core nozzles can expose heat shields to high temperature cycling, which can cause thermal fatigue. In some instances, portions of the core exhaust flow can redirect in a forward direction (e.g., upstream from a primary nozzle outlet) and flow within a gap (e.g., a batcave) between an outer sleeve of the primary nozzle and aft-strut fairing, which can cause damage to fire seals and/or vapor seals located upstream from the primary nozzle outlet. In some instances, the core exhaust flow entrains onto non-thermally protected aft strut fairings (e.g., composite fairing panels), which can cause scorch marks and/or other unaesthetically appealing marks. In some such instances, repair, replacement and/or cosmetic enhancement of the heat shields, fairings and/or other components may be needed, which can be costly and disruptive to aircraft manufacturers and/or aircraft service providers.

Example aircraft engine exhaust systems disclosed herein enable reduced length aft strut fairings. Example aircraft engines disclosed herein employ exhaust systems having long core nozzles to reduce or eliminate heat shield buckling, cracking and/or scorching. Specifically, example aircraft engine and mounting assemblies disclosed herein employ a long core nozzle having a terminating end or primary nozzle outlet that is substantially conterminous or coplanar with a terminating end of an aft strut fairing. As a result, portions or surfaces of the aft strut fairing downstream from the primary nozzle outlet are not exposed to the core exhaust flow and, thereby, enable use of a shorter aft fairing. In other words, an aft strut fairing does not include a horizontal portion that extends adjacent the core exhaust flow typically provided with aircraft engine and mounting assemblies employing short core nozzles. Further, example aircraft engine and mounting assemblies disclosed herein enable reduced exposure of aft strut fairing and/or aft strut components to heated core exhaust flow from a primary core nozzle. Thus, aircraft engine and mounting assemblies disclosed herein employing long core nozzles enable elimination of heat shields typically provided to protect aft strut components that would otherwise be directly exposed to core exhaust flow.

Additionally, example aircraft engine and mounting assemblies disclosed herein prevent core exhaust flow from flowing in a forward direction (e.g., toward a fore end of an aircraft engine), thereby preventing damage to components (e.g., fire seals, vapor seals, etc.) located upstream from the primary nozzle outlet and/or enable an aft strut fairing to experience cooler temperature airflow (e.g., less than 500° F.), thereby enabling a smaller heat shield upstream from the primary nozzle outlet. As a result, aircraft engine and mounting assemblies disclosed herein enable aft strut fairings to have a reduced length and/or heat shields to be smaller and/or formed of materials that can withstand lesser temperatures compared to conventional exhaust systems that employ short core nozzles. For example, exhaust systems disclosed herein can reduce heat shield and aft strut weight by 30-50% compared to conventional aircraft engines and mounting assemblies that employ short core nozzles (e.g., aft strut fairings and heat shields extending downstream of the primary nozzle outlet and exposed to the core exhaust flow). As a result, example exhaust systems disclosed herein reduce costs, weight, and overall enhancement of in-service reliability and maintainability without compromising aircraft operability and/or performance (e.g., aircraft engine efficiency).

FIG. 1 illustrates an example aircraft 100 having an aircraft engine and mounting assembly 102 in accordance with the teachings of this disclosure. The aircraft 100 includes wings 104 (e.g., a right wing and a left wing) extending laterally outward from a fuselage 106. Each of the wings 104 of the illustrated example supports the aircraft engine and mounting assembly 102 disclosed herein. The aircraft 100 of FIG. 1 is a commercial airliner (e.g., a Boeing 787). However, in other examples, the aircraft 100 can be any other aircraft.

Figure 2:
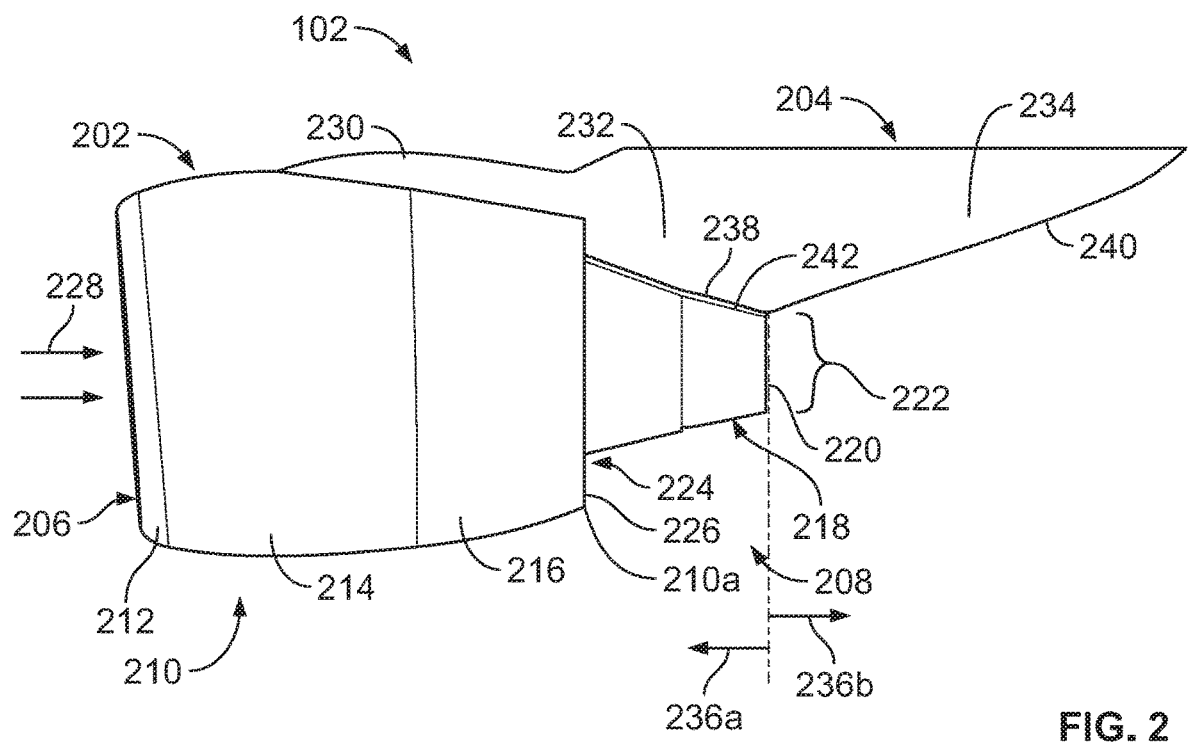
FIG. 2 is a side view of an example aircraft engine and mounting assembly of FIG. 1.

FIG. 2 is a side view of the aircraft engine and mounting assembly 102 of FIG. 1. The aircraft engine and mounting assembly 102 of FIG. 2 includes an aircraft engine 202 that couples to a respective one of the wings 104 via a pylon or strut 204. The aircraft engine 202 of FIG. 2 is a turbofan engine (e.g., a high-bypass turbofan engine). The aircraft engine 202 includes an air inlet 206, an exhaust system 208, and a nacelle 210 (e.g., between the air inlet 206 and the exhaust system 208) that encloses a fan and an engine core of the aircraft engine 202. The nacelle 210 has an aerodynamic outer surface to reduce drag. Specifically, the nacelle 210 includes a forward section or inlet cowl 212 (e.g., an outer panel) defining the air inlet, an intermediate section or fan cowl 214 (e.g., a clam-shell cowl), and a thrust reverser 216.

To exhaust gases produced by the engine core, the aircraft engine 202 includes the exhaust system 208. The exhaust system 208 of FIG. 2 includes primary nozzle 218 (e.g., a core nozzle) defining a primary nozzle outlet 220. The primary nozzle 218 is structured to expel a core exhaust flow 222 (e.g., heated exhaust or gasses) from the combustor portion of the aircraft engine 202. The exhaust system 208 of FIG. 2 includes a secondary nozzle 224 (e.g., a fan nozzle) defining a secondary nozzle outlet 226. The secondary nozzle 224 is disposed about the primary nozzle 218 and located proximate to a trailing edge 210a of the nacelle 210 opposite the air inlet 206. The secondary nozzle outlet 226 is structured to expel bypass airflow (e.g., accelerated airflow, cooler airflow). The secondary nozzle 224 is part of the thrust reverser 216 and defines a secondary sleeve that translates relative to nacelle 210 during activation of the thrust reverser 216.

In operation, the aircraft engine 202 draws airflow 228 into the air inlet 206 via the fan housed within the fan cowl 214. A portion of the airflow 228 flows to the engine core and a portion of the airflow 228 flows through a bypass (e.g., airflow channel) defined between the nacelle 210 and the engine core located within the nacelle 210. The portion of airflow 228 to the engine core is highly pressurized (e.g., via a compressor) and provided to a combustion chamber of the engine core, where fuel is injected and mixed with the highly pressurized air and ignited (e.g., the core exhaust flow). The core exhaust flow 222 (e.g., heated gasses or exhaust) from the primary nozzle 218 and the bypass airflow (e.g., the accelerated airflow, cooler airflow) from the secondary nozzle 224 exhausted via the exhaust system 208 produce forward thrust that propels the aircraft 100 (e.g., in a forward direction).

The strut 204 of FIG. 2 includes an aft strut fairing 230 having a first portion 232 and a second portion 234. The first portion 232 of the aft strut fairing 230 is located upstream 236a from the primary nozzle outlet 220 and the second portion 234 of the aft strut fairing 230 (e.g., an aft pylon portion) is located downstream 236b from the primary nozzle outlet 220. The first portion 232 of the aft strut fairing 230 of FIG. 2 includes a first lower surface 238 (e.g., a lower edge) of the aft strut fairing 230 and the second portion 234 of the aft strut fairing 230 of FIG. 2 includes a second lower surface 240 (e.g., a lower edge). The second lower surface 240 of the aft strut fairing 230 is sometimes referred to as an aft-strut fairing closeout or a pylon fairing closeout.

To protect the aft strut fairing 230 from the core exhaust flow 222 of the primary nozzle 218 during operation, the first portion 232 of the aft strut fairing 230 includes a heat shield 242. Specifically, the heat shield 242 is coupled to the first lower surface 238 of the aft strut fairing 230. The heat shield 242 of the illustrated example is located upstream 236a from the primary nozzle 218 (e.g., the primary nozzle outlet 220). The second portion 234 of the aft strut fairing 230 does not include a heat shield.

Figure 3:
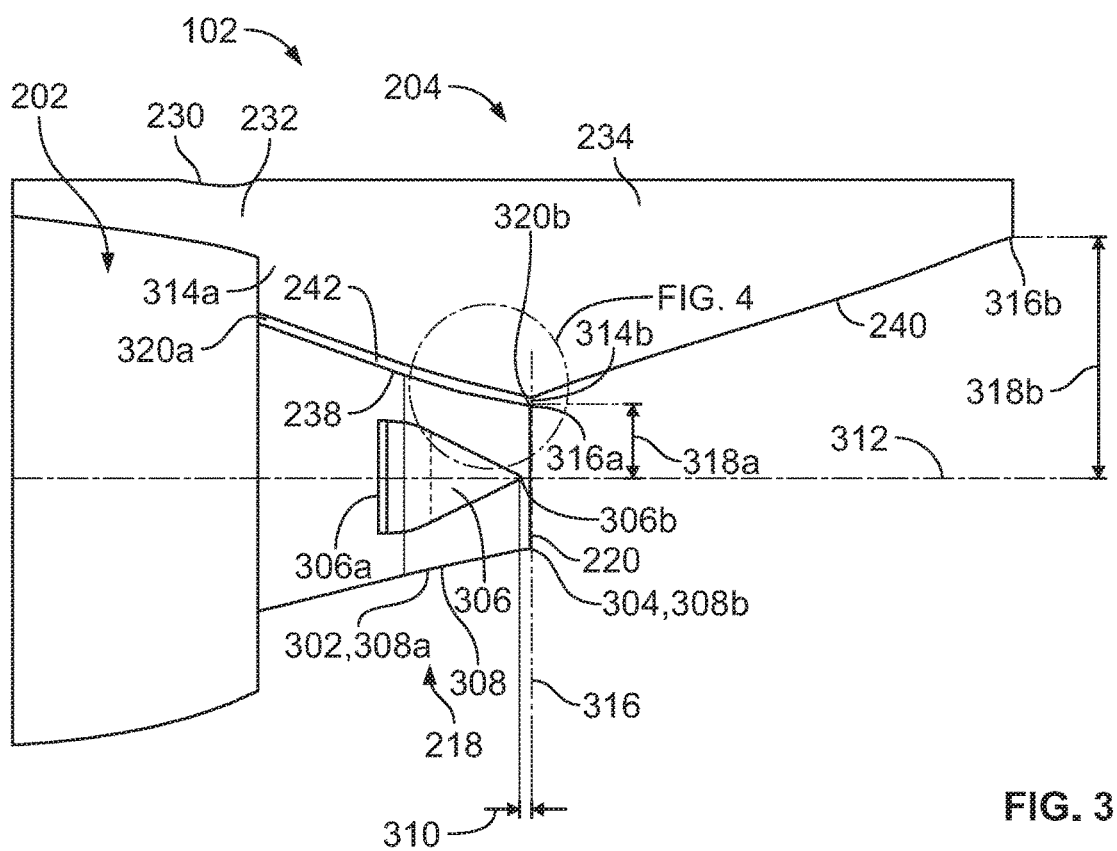
FIG. 3 is another side view of the example aircraft engine and mounting assembly of FIGS. 1-2.

FIG. 3 is an enlarged view of the aircraft engine and mounting assembly 102 of FIG. 2. The primary nozzle 218 is a long core nozzle. The primary nozzle 218 has a leading edge 302 (e.g., an upstream end) and a trailing edge 304 (e.g., a downstream end). The primary nozzle 218 includes a primary nozzle plug 306 and a primary nozzle sleeve 308. The primary nozzle plug 306 of FIG. 3 is positioned within the primary nozzle sleeve 308. The primary nozzle plug 306 includes an upstream end 306a (e.g., a proximal end) and a downstream or terminating end 306b (e.g., a distal end). The primary nozzle sleeve 308 defines a leading edge 308a and a trailing edge 308b (e.g., a terminating end). The trailing edge 308b of the primary nozzle sleeve 308 of the illustrated example defines the trailing edge 304 and/or the primary nozzle outlet 220 of the primary nozzle 218. The distal end 306b of the primary nozzle plug 306 is recessed relative to the trailing edge 304 of the primary nozzle 218. For example, the distal end 306b of the primary nozzle plug 306 is recessed (e.g., upstream) relative to a trailing edge 308b of the primary nozzle sleeve 308 by a distance 310 (e.g., between approximately zero inches and five inches). As a result of recessing the distal end 306b of the primary plug 306 relative to the trailing edge 308b of the primary nozzle sleeve 308, an outlet area and/or an outlet volume of the aircraft engine 202 is increased to improve performance. In some examples, increasing the outlet volume of the primary nozzle outlet 220 maintains the outlet volume within a threshold that does not require certification of the aircraft engine 202. For example, the primary nozzle 218 of FIG. 3 provides an outlet volume that is substantially similar (e.g., identical or within 2 percent) of an outlet volume provided by a short core nozzle of known aircraft engines. However, in some examples, the distal end 306b of the primary nozzle plug 306 is substantially conterminous relative to the trailing edge 304 of the primary nozzle (e.g., the primary nozzle outlet 220 and/or the trailing edge 308b of the primary nozzle sleeve 308).

As used herein, "substantially conterminous" means that ends (e.g., terminating ends) of two or more respective structures are coplanar (e.g., the ends lie on a plane perpendicular to a longitudinal axis 312 of the aircraft engine 202 (e.g., a vertical plane)). In some examples, due to manufacturing tolerances, "substantially conterminous" means that a first end (e.g., a first terminating end) of a first structure and a second end (e.g., a second terminating end) of a second structure are spaced a distance along the longitudinal axis of between approximately 1/64 of an inch and 2 inches.

The first portion 232 (e.g., the first lower surface 238) of the aft strut fairing 230 has a first leading end 314a (e.g., a first end or edge) and a first trailing end 314b (e.g., a second end or edge). The first portion 232 extends between the trailing edge 210a of the nacelle 210 and the trailing edge 308b of the primary nozzle sleeve 308. The first lower surface 238 of the aft strut fairing 230 is non-parallel relative to the longitudinal axis 312 of the primary nozzle outlet 220. The first portion 232 is angled relative to the longitudinal axis 312 in a direction that converges toward the primary nozzle outlet 220 from the first leading end 314a to the first trailing end 314b. Additionally, unlike some conventional turbojet aircraft engines, the aft strut fairing 230 does not extend horizontally aft of the primary nozzle outlet 220. In this manner, no portions (e.g., surfaces) of the aft strut fairing 230 and heat shield 242 are exposed to the core exhaust flow 222. For example, some conventional turbojet engines employ a first lower surface that extends horizontally aft of the primary nozzle outlet 220 a distance of approximately 13 inches.

The second portion 234 (e.g., the second lower surface 240) of the aft strut fairing 230 has a second leading end 316a (e.g., a third end or proximal end or edge) and a second trailing end 316b (e.g., a fourth end or distal end or edge). The second lower surface 240 of the aft strut fairing 230 is non-parallel relative to the longitudinal axis 312 of the primary nozzle outlet 220. Specifically, the second lower surface 240 of the aft strut fairing 230 diverges away (e.g., has an inclined profile) relative to the primary nozzle outlet 220 from the second leading end 316a to the second trailing end 316b. For example, the second lower surface 240 of the aft strut fairing 230 is angled relative to the longitudinal axis 312 of the primary nozzle outlet 220 to prevent entrainment of the core exhaust flow 222 (e.g., heated gas) exiting the primary nozzle outlet 220 onto the second lower surface 240. For example, a first vertical distance 318a between the second leading end 316a and the longitudinal axis 312 of the primary nozzle 218 is less than a second vertical distance 318b between the second trailing end 316b and the longitudinal axis 312 of the primary nozzle 218. Additionally, the second portion 234 of the aft strut fairing 230, although having an angled profile, has a volume that is similar to a volume of second portions of aft strut fairings that have a less angled lower portion. In this manner, the second portion 234 does not interfere with placement of drain tubes and/or other components located within the aft strut fairing 230.

The first leading end 314a is upstream from the primary nozzle outlet 220 and the second trailing end 316b is downstream from the primary nozzle outlet 220. The first trailing end 314b of the first portion 232 is located substantially conterminous with the second leading end 316a of the second portion 234. Additionally, the first trailing end 314b and/or the second leading end 316a of FIG. 3 are substantially coterminous with the primary nozzle outlet 220. In other words, first trailing end 314b, the second leading end 316a, the trailing edge 308b of the primary nozzle sleeve 308 and the primary nozzle outlet 220 are coplanar (e.g., lie along a same plane 316 perpendicular to the longitudinal axis 312 of the primary nozzle 218.

The heat shield 242 is coupled to the first lower surface 238 of the aft strut fairing 230. The heat shield 242 has a first or upstream end 320a (e.g., an upstream end or a leading edge) and a second or downstream end 320b (e.g., a downstream end or a trailing edge). The second end 320b of the heat shield 242 is upstream from the trailing edge 308b of the primary nozzle sleeve 308 and/or the primary nozzle 218. The second end 320b (e.g., the downstream end) of the heat shield 242 is substantially coterminous with the primary nozzle outlet 220. Specifically, the second end 320b of the heat shield 242 of FIG. 3 is substantially coterminous with primary nozzle outlet 220 and/or the trailing edge 308b of the primary nozzle sleeve 308. For example, the trailing edge 304 of the primary nozzle outlet 220 and/or the trailing edge 308b of the primary nozzle sleeve 308 align (e.g., vertically) with the second end 320b of the heat shield 242. Thus, the heat shield 242 has the first end 320a (e.g., a leading edge) upstream from the primary nozzle outlet 220 and the second end 320b (e.g., a trailing edge) coterminous with the primary nozzle outlet 220 and/or the first trailing end 314b of the first lower surface 238 of the aft strut fairing 230. In the example of FIG. 3, the second end 320b (e.g., a terminating end) of the heat shield 242 and the trailing edge 308b of the primary nozzle sleeve 308 and/or the primary nozzle outlet 220 are coplanar. Specifically, the second end 320b (e.g., a terminating end) of the heat shield 242, the first trailing end 314b of the first lower surface 238, the second leading end 316a of the second lower surface 240, and the trailing edge 308b of the primary nozzle sleeve 308 and/or the primary nozzle outlet 220 are substantially conterminous (e.g., coplanar).

The second lower surface 240 of the aft strut fairing 230 located downstream from the primary nozzle outlet 220 does not include a heat shield. For example, the heat shield 242 does not extend along the aft strut fairing 230 downstream from the primary nozzle outlet 220 (e.g., the trailing edge 304 of the primary nozzle 218 and/or the trailing edge 308b of the primary nozzle sleeve 308). In other words, a surface between the second leading end 316a and the second trailing end 316b does not include a heat shield. The heat shield 242 is positioned only on a portion of the aft strut fairing 230 that is located upstream from the primary nozzle outlet 220 (e.g., the trailing edge 304 of the primary nozzle 218 and/or the trailing edge 308b of the primary nozzle sleeve 308.

Figure 4:
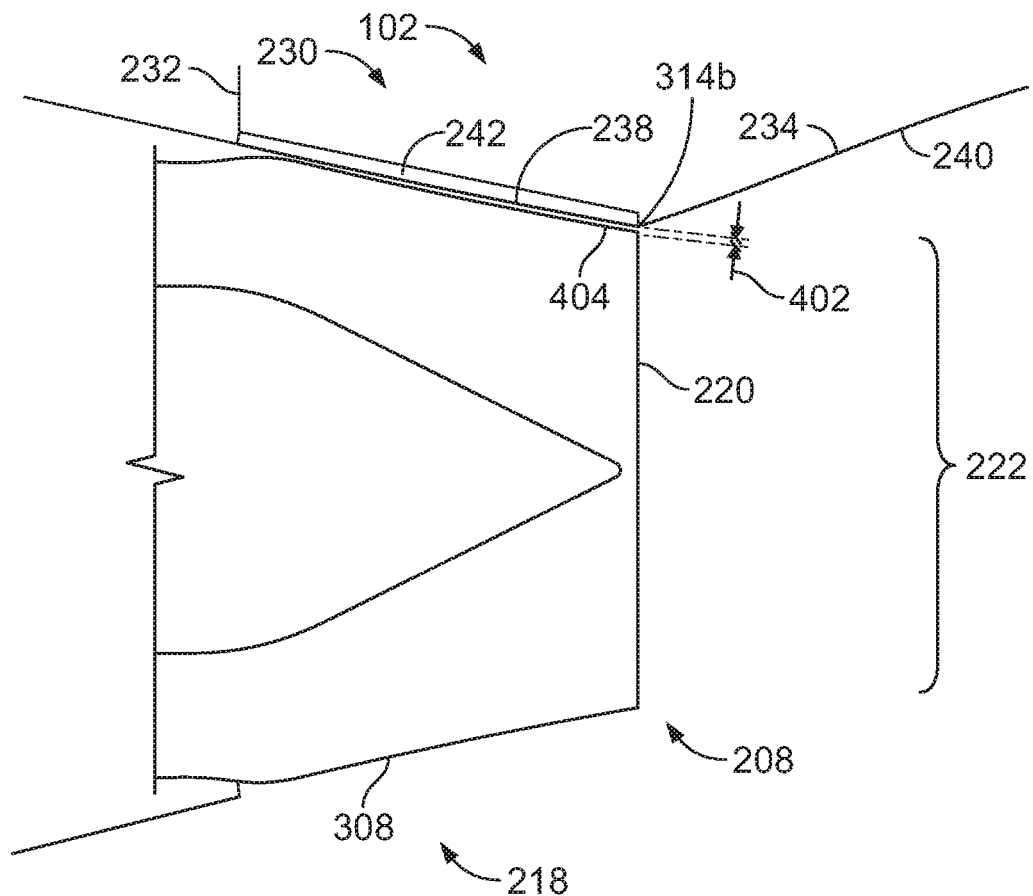
FIG. 4 is an enlarged view of a portion of the example aircraft engine and mounting assembly of FIG. 3.

FIG. 4 is an enlarged view of the aircraft engine and mounting assembly 102 of FIG. 2. The aircraft engine and mounting assembly 102 forms a gap 402 between the primary nozzle 218 and the aft strut fairing 230. Specifically, the gap 402 is formed between an outer surface 404 of the primary nozzle sleeve 308 and the first lower surface 238 of the first portion 232 of the aft strut fairing 230 and extends in a fore or upstream direction between the primary nozzle outlet 220 and the leading edge of the primary nozzle sleeve 308. The heat shield 242 is provided along the gap 402. In other words, the heat shield 242 extends and/or protrudes within the gap 402. Unlike known aircraft engines, the conterminous relationship between the primary nozzle outlet 220 and the first trailing end 314b of the first lower surface 238 of the first portion 232 of the aft strut fairing 230 prevents the core exhaust flow 222 from flowing in a forward direction (e.g., upstream from the primary nozzle outlet 220) and within the gap 402. Thus, seals (e.g. vapor seals), panels, fairings, and/or other structure(s) of the aircraft 100 upstream from the primary nozzle outlet 220 are not susceptible to damage from the temperature (e.g., 1000° F.) of the core exhaust flow 222. Additionally, the angled position of the second lower surface 240 of the second portion 234 of the aft strut fairing 230 prevents entrainment of the core exhaust flow 222 on the second lower surface 240, thereby preventing scorch marks and/or other aesthetically unappealing damage and/or condition(s) that can be otherwise caused by the core exhaust flow 222.

Figure 5:
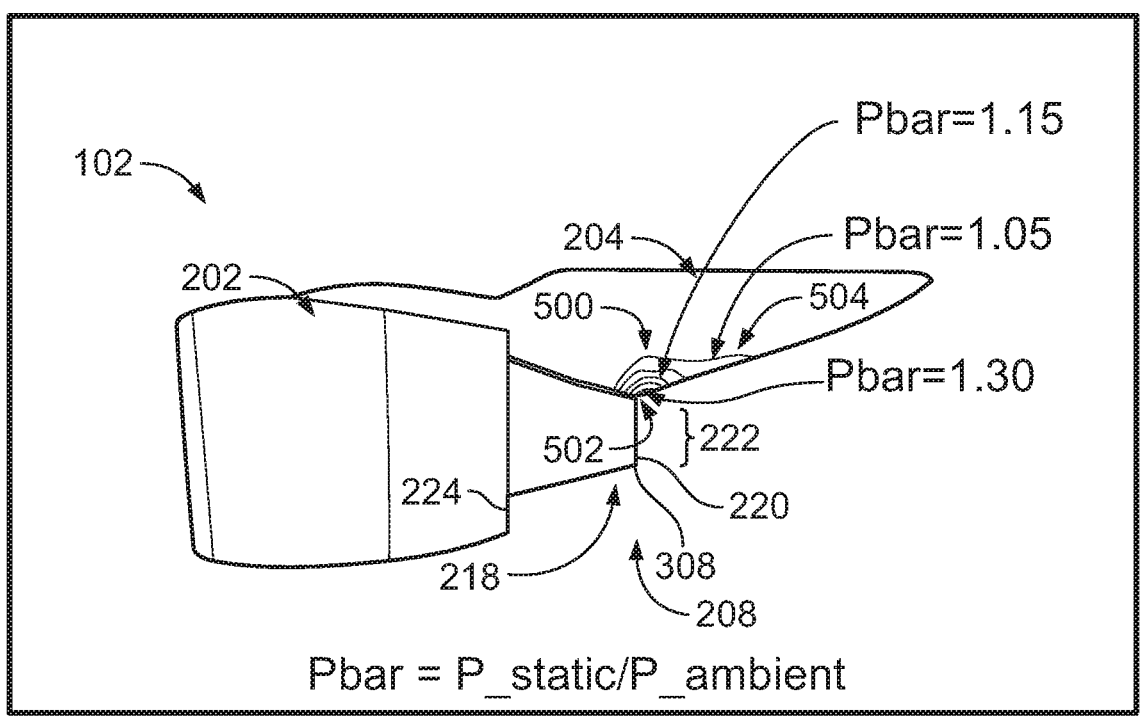
FIG. 5 is a side view of the example aircraft engine and mounting assembly of FIGS. 1-4 showing a pressure distribution of an exhaust flow field of the example aircraft engine exhaust system of FIGS. 1-4.

FIG. 5 is a side view of the aircraft engine and mounting assembly 102 of FIGS. 1-4 showing a pressure distribution of an exhaust flow field 500 of the exhaust system 208. The exhaust flow field 500 includes the core exhaust flow 222 provided by the primary nozzle 218 and the bypass airflow provided by the secondary nozzle 224. The exhaust system 208 (e.g., the primary nozzle 218) produces a localized high pressure area 502 adjacent the gap 402 to prevent core exhaust flow 222 (e.g., heated gases) exiting the primary nozzle outlet 220 from flowing in a forward direction towards the gap 402. The localized high pressure area 502 forms at an interface between the first trailing end 314b of the first lower surface 238 and the trailing edge 308b of the primary nozzle sleeve 308. In other words, during operation, the localized high pressure area 502 adjacent the gap 402 prevents portions of the core exhaust flow 222 from flowing in a reverse direction (e.g., toward a fore end of the aircraft engine 202) and within the gap 402. For example, the localized high pressure area 502 of the exhaust flow field 500 at the gap 402 experiences a relatively high pressure compared to other areas 504 of the exhaust flow field 500, which have a relatively lower pressure compared to the localized high pressure area 502. For example, the localized high pressure area 502 of the exhaust flow field 500 has a pressure of approximately 1.3 Pbar (0.13 megapascal (MPa)) and the other areas 504 of the exhaust flow field 500 have pressures of between approximately 0.85 Pbar (0.085 MPa) and 1.2 Pbar (0.12 MPa). The relatively higher pressure of the localized high pressure area 502 of the exhaust flow field 500 adjacent the gap 402 is sufficient to provide a barrier that restricts or prevents the core exhaust flow 222 from flowing (e.g., in a forward direction) into the gap 402.

Figure 6A:
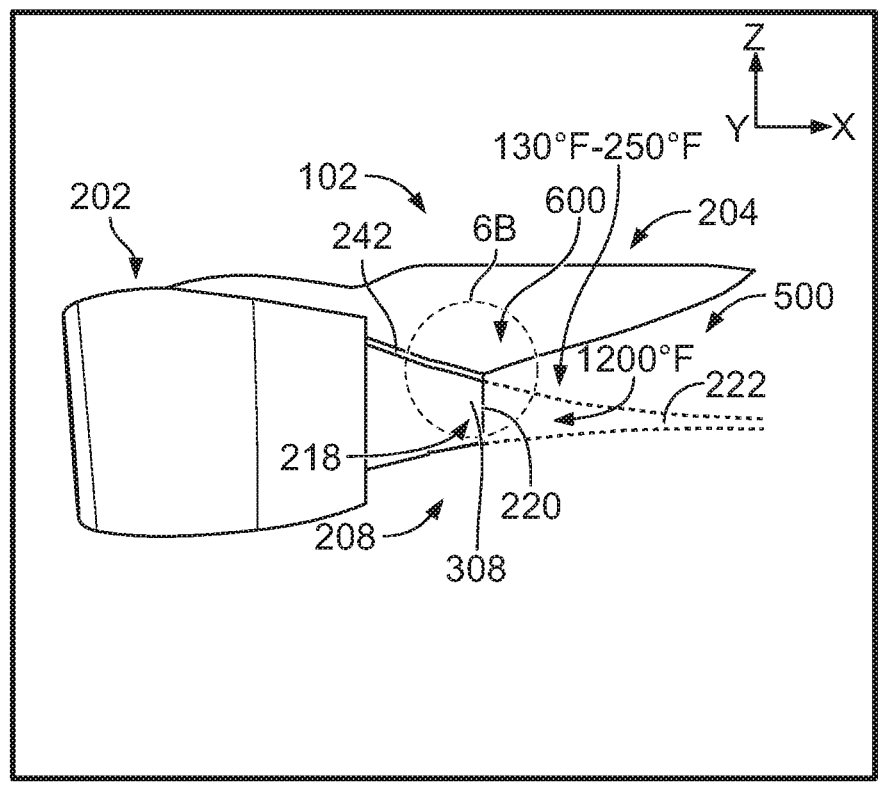
FIG. 6A is a side view of the example aircraft engine and mounting assembly of FIGS. 1-5 showing a temperature distribution of the exhaust flow field of the example aircraft engine exhaust system of FIGS. 1-4.
Figure 6B:
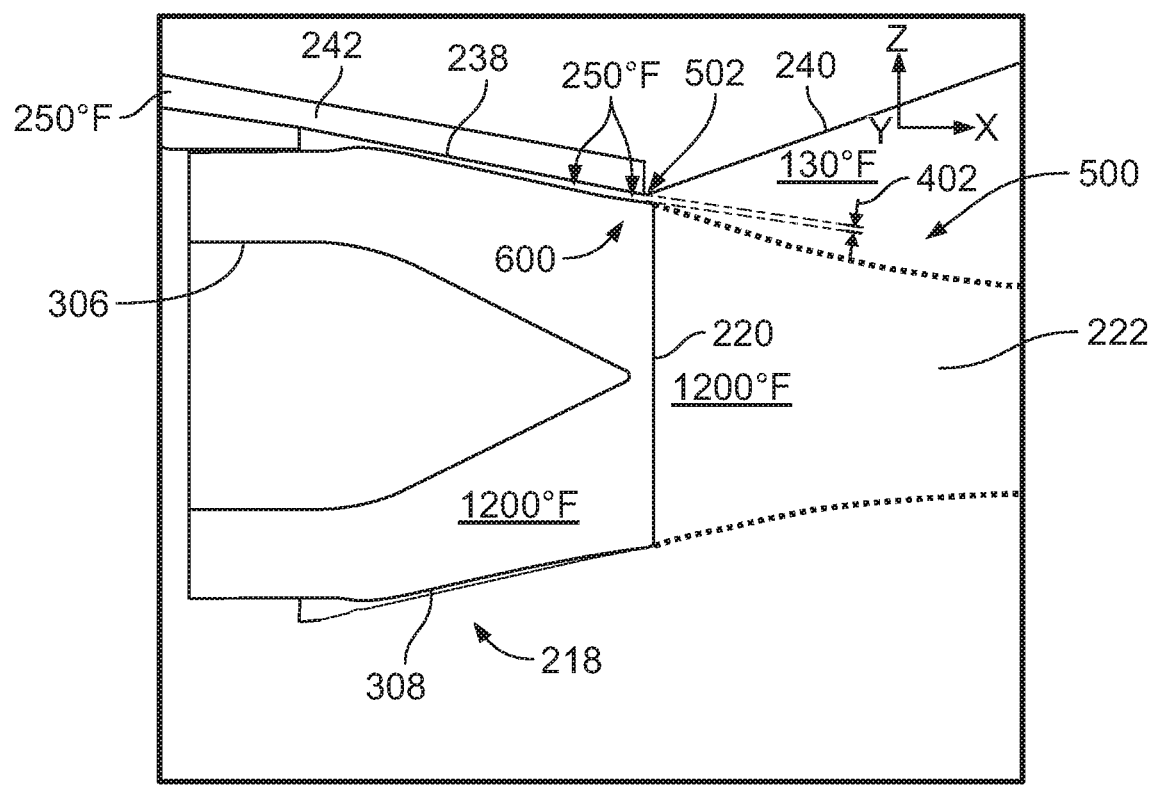
FIG. 6B is an enlarged view of a portion of the example aircraft engine and mounting assembly of FIG. 6A.

FIG. 6A is a side view of the aircraft engine and mounting assembly 102 of FIGS. 1-5 showing a temperature distribution of the exhaust flow field 500 of the exhaust system 208. FIG. 6B is an enlarged portion of the aircraft engine and mounting assembly 102 of FIG. 6A. During operation, the exhaust flow field 500 has the greatest temperature at the primary nozzle outlet 220, including an area 600 adjacent the gap 402 (e.g., overlapping the localized high pressure area 502 of FIG. 5). For example, a temperature of the exhaust flow field 500 adjacent the primary nozzle outlet 220 and/or the area 600 is approximately 1000° F. However, the localized high pressure area 502 of the exhaust flow field 500 adjacent or at (e.g., an opening of) the gap 402 restricts or prevents the high temperature exhaust from the core exhaust flow 222 from reversing in the fore direction and flowing (e.g., upstream) within the gap 402. For example, in the example of FIGS. 6A and 6B, airflow within the gap 402 has a temperature of approximately between 200° F. and 300° F. Additionally, the core exhaust flow 222 separates (e.g., cleanly separates) from the second portion 234 of the aft strut fairing 230 (e.g., an aft pylon portion) and, thus, eliminates entrainment of the core exhaust flow 222 onto the second lower surface 240 of the aft strut fairing 230. Thus, the heat shield 242 is not required to withstand such high temperatures (e.g., greater than 300° F.) and the design requirements can be reduced accordingly, potentially saving cost and weight. For example, the heat shield 242 can be composed of a material (e.g., aluminum) that is less expensive than a heat shield composed of a material that can withstand higher temperatures (e.g., greater than 500° F.) (e.g., that would otherwise be required).

Additionally, the aft strut fairing 230 is configured to prevent entrainment of the core exhaust flow 222 onto the second portion 234 (e.g., the second lower surface 240) of the aft strut fairing 230. Specifically, the inclined profile of the second lower surface 240 of the second portion 234 of the aft strut fairing 230 positions the second lower surface 240 outside of the exhaust flow field 500. Thus, the second lower surface 240 of the aft strut fairing 230 does not require a heat shield, thereby reducing costs and/or reducing scorching and/or other heat related issues that may otherwise occur if the second lower surface 240 was positioned within the exhaust flow field 500. Additionally, the substantially coterminous relationship between the primary nozzle outlet 220 and the first trailing end 314b of the first lower surface 238 of the aft strut fairing 230 removes the first lower surface 238 of the aft strut fairing 230 from the exhaust flow field 500. Further, the localized high pressure area 502 prevents heated exhaust from flowing to the gap 402, thereby reducing scorching and/or other aesthetic issues that the heat shield 242 may otherwise experience. Thus, the exhaust system 208 disclosed herein reduces maintenance that may otherwise be needed to replace and/or repair heat shields, aft strut fairings, etc.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one of B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/ or steps, the phrase "at least one of A and B" is intended to refer to implementations including any of (1) at least A, (2) at least B, and (3) at least A and at least B. Similarly, as used herein in the context of describing the performance or execution of processes, instructions, actions, activities and/ or steps, the phrase "at least one of A or B" is intended to refer to implementations including any of (1) at least A, (2) at least B, and (3) at least A and at least B.

Example apparatus, systems, and articles of manufacture disclosed herein provide aircraft engines employing exhaust systems having long core nozzles to reduce or eliminate heat shield buckling, cracking and/or aft strut scorching, which may otherwise be experienced with aircraft engines that employ short core nozzles. As a result, example exhaust systems disclosed herein reduce costs, weight, and overall enhancement of in-service relatability and maintainability without compromising aircraft operability and/or performance (e.g., aircraft engine efficiency). Further examples and combinations thereof include the following:

In some examples, a turbofan engine exhaust system of an aircraft having a primary nozzle having a leading edge and a trailing edge, and a heat shield coupled to an aft strut fairing. The heat shield has an upstream end and a downstream end. The downstream end of the heat shield is substantially coterminous with the trailing edge of the primary nozzle.

In some examples, the primary nozzle includes a primary nozzle plug and a primary nozzle sleeve. A distal end of the primary nozzle plug is recessed relative to a trailing edge of the primary nozzle sleeve.

In some examples, the primary nozzle includes a primary nozzle plug and a primary nozzle sleeve, a distal end of the primary nozzle plug being substantially conterminous relative to a trailing edge of the primary nozzle sleeve.

In some examples, the heat shield does not extend along the aft strut fairing downstream from the trailing edge of the primary nozzle.

In some examples, the primary nozzle includes a primary nozzle plug and a primary nozzle sleeve, the primary nozzle sleeve having a terminating end that aligns with the downstream end of the heat shield.

In some examples, an aircraft includes a turbofan engine having a primary nozzle defining a primary nozzle outlet and an aft strut fairing having a first lower surface upstream from the primary nozzle outlet and a second lower surface downstream from the primary nozzle outlet. The first lower surface having a first leading end and a first trailing end. The second lower surface having a second leading end and a second trailing end. The first trailing end and the second leading end being substantially coterminous with the primary nozzle outlet. A heat shield is coupled to the first lower surface of the aft strut fairing. The heat shield has an upstream end and a downstream end. The downstream end of the heat shield is coterminous with primary nozzle outlet.

In some examples, the primary nozzle includes a primary nozzle plug and a primary nozzle sleeve, the primary nozzle plug has an upstream end and downstream end, and where the downstream end is located upstream from the primary nozzle outlet.

In some examples, the second lower surface of the aft strut fairing is located downstream from the primary nozzle outlet does not include a heat shield.

In some examples, the second lower surface has an inclined profile from the second leading end to the second trailing end.

In some examples, a first vertical distance between the second leading end and a longitudinal axis of the primary nozzle is less than a second vertical distance between the second trailing end and the longitudinal axis of the primary nozzle.

In some examples, the second lower surface is non-parallel relative to a longitudinal axis of the primary nozzle outlet.

In some examples, the second lower surface of the aft strut fairing diverges away from the primary nozzle outlet from the primary nozzle outlet towards an aft end of the aircraft.

In some examples, a gap formed between the aft strut fairing and a primary sleeve of the primary nozzle, the primary nozzle to produce a localized high pressure area at the primary nozzle outlet to prevent core exhaust flow exiting the primary nozzle outlet from flowing towards the gap.

In some examples, an aircraft includes an aircraft engine having a primary nozzle defining a primary nozzle outlet. An aft strut fairing includes a first lower surface having a first leading end upstream from the primary nozzle outlet and a first trailing end located adjacent the primary nozzle outlet, and a heat shield coupled to the first lower surface of the aft strut fairing. The heat shield having a first end upstream from the primary nozzle outlet and a second end substantially coterminous with the primary nozzle outlet and the first trailing end of the first lower surface of the aft strut fairing.

In some examples, the aft strut fairing includes a second lower surface having a second leading end adjacent the primary nozzle outlet and a second trailing end downstream from the primary nozzle outlet.

In some examples, the second lower surface is non-parallel relative to a longitudinal axis of the primary nozzle outlet.

In some examples, the second lower surface diverges away from the primary nozzle outlet between the second leading end and the second trailing end.

In some examples, the second lower surface is angled relative to the primary nozzle outlet to prevent entrainment of core exhaust flow exiting the primary nozzle outlet onto the second lower surface.

In some examples, the second lower surface does not include the heat shield.

In some examples, a gap formed between the aft strut fairing upstream from the primary nozzle outlet and a primary sleeve of the primary nozzle, the primary nozzle to produce a localized high pressure area at the upper region of the primary nozzle outlet to prevent core exhaust flow exiting the primary nozzle outlet from flowing towards the gap and also preventing the hot-flow from entraining and scorching the aft strut surfaces, preventing overheating, warping and cracking which is a very common problem.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An aircraft comprising:
   a primary nozzle having a leading edge and a trailing edge, the trailing edge defining a primary nozzle outlet, the primary nozzle includes a primary nozzle plug and a primary nozzle sleeve, a distal end of the primary nozzle plug recessed relative to a trailing edge of the primary nozzle sleeve, wherein during flight, the primary nozzle outlet generates a first localized pressure region of 1.3 Pbar and a second localized pressure region of between 0.85 Pbar and 1.2 Pbar;

an aft strut fairing having a first lower surface upstream from the primary nozzle and a second lower surface downstream from the primary nozzle, the first lower surface having a trailing end, the second lower surface having a leading end, the trailing end of the first lower surface, and the leading end of the second lower surface being coplanar with the primary nozzle outlet of the primary nozzle; and a heat shield coupled to the first lower surface of the aft strut fairing, the heat shield having an upstream end and a downstream end, the downstream end of the heat shield being coplanar or substantially coterminous with the trailing edge of the primary nozzle, wherein the heat shield does not extend along the aft strut fairing downstream from the trailing edge of the primary nozzle, and wherein the aft strut fairing does not include any heat shields downstream from the primary nozzle outlet.

2. The aircraft of claim 1, wherein the primary nozzle sleeve includes a terminating end that aligns with the downstream end of the heat shield.

3. An aircraft comprising:

a turbofan engine having a primary nozzle that includes a primary nozzle sleeve defining a primary nozzle outlet, the primary nozzle outlet generating a first localized pressure region of 1.3 Pbar in operation and a second localized pressure region to include pressures between 0.85 Pbar and 1.2 Pbar in operation;

an aft strut fairing having a first lower surface upstream from the primary nozzle outlet and a second lower surface downstream from the primary nozzle outlet, the first lower surface having a first leading end and a first trailing end, the second lower surface having a second leading end and a second trailing end, the first trailing end and the second leading end being substantially coterminous with a trailing edge of the primary nozzle sleeve, the second lower surface of the aft strut fairing having an inclined profile from the second leading end to the second trailing end such that the second lower surface of the aft strut fairing is positioned outside of an exhaust flow field of the primary nozzle; and a heat shield coupled to the first lower surface of the aft strut fairing, the heat shield having an upstream end and a downstream end, the downstream end of the heat shield terminates at a location substantially coterminous with the primary nozzle outlet.

4. The aircraft of claim 3, wherein the primary nozzle includes a primary nozzle plug and the primary nozzle sleeve, the primary nozzle plug having an upstream end and a downstream end, and wherein the downstream end of the primary nozzle plug is located upstream from the primary nozzle outlet.

5. The aircraft of claim 3, wherein the second lower surface of the aft strut fairing is downstream from the primary nozzle outlet, the second lower surface of the aft strut fairing does not include at least one of the heat shield or any other heat shields.

6. The aircraft of claim 3, wherein a first vertical distance between a second leading surface and a longitudinal axis of the primary nozzle is less than a second vertical distance between the second trailing end and the longitudinal axis of the primary nozzle.

7. The aircraft of claim 3, wherein the second lower surface is non-parallel relative to a longitudinal axis of the primary nozzle outlet.

8. The aircraft of claim 3, wherein the second lower surface of the aft strut fairing diverges away from the primary nozzle outlet towards an aft end of the aircraft.

9. The aircraft of claim 3, wherein the first localized pressure region is a localized high pressure area and further including a gap formed between the aft strut fairing and a primary sleeve of the primary nozzle, the primary nozzle to produce the localized high pressure area at the primary nozzle outlet to prevent core exhaust flow exiting the primary nozzle outlet from flowing towards the gap, wherein a difference in pressure prevents the core exhaust flow from flowing towards the gap and the core exhaust flow does not scorch underneath the second lower surface of the aft strut fairing, despite the second lower surface of the aft strut fairing not including a heat shield.

10. The aircraft of claim 1, wherein the second lower surface is non-parallel relative to a longitudinal axis of the primary nozzle outlet.

11. The aircraft of claim 1, wherein the first lower surface converges toward the primary nozzle outlet, and wherein the second lower surface diverges away from the primary nozzle outlet.

12. The aircraft of claim 1, wherein the second lower surface is angled relative to the primary nozzle outlet to prevent entrainment of core exhaust flow exiting the primary nozzle outlet onto the second lower surface.

13. The aircraft of claim 1, further including a gap formed between the aft strut fairing upstream from the primary nozzle outlet and the primary sleeve of the primary nozzle, the first localized pressure region at the primary nozzle outlet to prevent core exhaust flow exiting the primary nozzle outlet from flowing towards the gap.

14. The aircraft of claim 3, wherein the aft strut fairing does not include an intermediate horizontal surface between the trailing edge of the first lower surface and the second leading end of the second lower surface.

15. The aircraft of claim 1, wherein the distal end of the primary nozzle plug is recessed relative to the trailing edge of the primary nozzle sleeve by a distance between zero inches and five inches.

16. The aircraft of claim 1, wherein a first temperature corresponding to the primary nozzle is 1000 degrees Fahrenheit, and a second temperature corresponding to the second lower surface is 130 degrees Fahrenheit.

* * * * *